United States Patent
Gaspard et al.

(10) Patent No.: US 9,800,737 B2
(45) Date of Patent: Oct. 24, 2017

(54) DOOR ENTRY SYSTEMS AND METHODS

(71) Applicant: DropBy, Inc., San Francisco, CA (US)

(72) Inventors: Camille Gaspard, San Francisco, CA (US); Nabeel Samad, San Francisco, CA (US); John McQueen, San Francisco, CA (US)

(73) Assignee: DropBy, Inc., San Francisco, CA (US)

( * ) Notice: Subject to any disclaimer, the term of this patent is extended or adjusted under 35 U.S.C. 154(b) by 0 days.

(21) Appl. No.: 15/413,060

(22) Filed: Jan. 23, 2017

(65) Prior Publication Data
US 2017/0214801 A1 Jul. 27, 2017

Related U.S. Application Data

(60) Provisional application No. 62/281,763, filed on Jan. 22, 2016.

(51) Int. Cl.
*H04M 11/00* (2006.01)
*H04M 11/02* (2006.01)
*G07C 9/00* (2006.01)
*H04M 1/247* (2006.01)
*H04M 7/12* (2006.01)
*H04M 3/42* (2006.01)

(52) U.S. Cl.
CPC ....... *H04M 11/025* (2013.01); *G07C 9/00142* (2013.01); *G07C 9/00166* (2013.01); *H04M 1/2473* (2013.01); *H04M 3/42161* (2013.01); *H04M 7/1295* (2013.01)

(58) Field of Classification Search
CPC .......... H04M 11/025; H04M 3/42161; H04M 1/2473; H04M 7/1295; G07C 9/00142; G07C 9/00166
See application file for complete search history.

(56) References Cited

U.S. PATENT DOCUMENTS

| | | | |
|---|---|---|---|
| 5,982,861 A | 11/1999 | Holloway et al. | |
| 6,885,738 B2 * | 4/2005 | White | H04M 11/007 379/102.06 |
| 7,064,652 B2 | 6/2006 | Junqua et al. | |

(Continued)

OTHER PUBLICATIONS

"New York Discovers Keyless Entry Systems"—The New York Times, by Michelle Higgins, Jan. 1, 2016, 3 pages.

(Continued)

*Primary Examiner* — Stella Woo
(74) *Attorney, Agent, or Firm* — Meunier Carlin & Curfman LLC

(57) ABSTRACT

Various implementations include systems and methods for unlocking a door to a building on behalf of a tenant of the building that addresses the shortcomings of legacy telephone entry systems and allows for more efficient and safer management of building entry requests from third parties. In some implementations, the system taps into the legacy telephone entry systems to communicate with third parties seeking entry into the building. In some implementations, the system communicates with third party computing devices (e.g., stationary or mobile devices) to process entry requests. And, in some implementations, the system communicates entry preferences (or parameters) associated with a tenant with a door lock system to allow for entry during certain time windows or under certain conditions.

18 Claims, 11 Drawing Sheets

(56) References Cited

U.S. PATENT DOCUMENTS

| | | | |
|---|---|---|---|
| 9,478,084 B1* | 10/2016 | Robinson | G07C 9/00111 |
| 2004/0057567 A1 | 3/2004 | Lee et al. | |
| 2005/0165612 A1 | 7/2005 | Van Rysselberghe et al. | |
| 2007/0103548 A1 | 5/2007 | Carter et al. | |
| 2007/0247277 A1 | 10/2007 | Murchison et al. | |
| 2008/0130956 A1 | 6/2008 | Jordan et al. | |
| 2010/0176917 A1 | 7/2010 | Bacarella et al. | |
| 2013/0017812 A1* | 1/2013 | Foster | H04L 12/2825 455/417 |
| 2014/0002236 A1* | 1/2014 | Pineau | G06F 21/32 340/5.6 |
| 2015/0081343 A1 | 3/2015 | Streebin | |
| 2016/0216106 A1 | 7/2016 | Motoyama et al. | |

OTHER PUBLICATIONS

Co-pending U.S. Appl. No. 15/413,065, filed Jan. 23, 2017.
Non-Final Office Action issued in U.S. Appl. No. 15/413,065, dated Jul. 3, 2017.

* cited by examiner

DOOR ENTRY SYSTEMS AND METHODS

CROSS REFERENCE TO RELATED APPLICATION

This application claims priority to U.S. Provisional Patent Application No. 62/281,763, which is titled "Door Entry Systems and Methods," and was filed on Jan. 22, 2016, the content of which is herein incorporated by reference in its entirety.

BACKGROUND

Legacy telephone entry systems for multi-unit buildings were designed decades ago to enable building tenants to communicate with visitors and remotely unlock a building door. These archaic systems provide a telephone connection between visitors at building doors outside and tenants inside their units. However, the systems are not equipped to verify a visitor's identity, which can compromise the security of the building. Also, the systems require a tenant to remotely unlock the door at the moment requested by the visitor, which keeps legitimate visitors from being able to enter the building with the tenant is unavailable or unreachable. Furthermore, the systems do not provide a record of visitors that entered the building.

A number of recent trends have exposed the limitations of legacy telephone entry systems and created a significant pain point for building tenants. First, there is an ongoing shift from brick-and-mortar retail shopping to online retail shopping that has resulted in an explosion of package deliveries. As building tenants increasingly rely on online shopping for basic goods, they expect their packages to be delivered into their buildings on time and securely. Package delivery services also want to deliver packages on the first attempt, which prevents having to process a package multiple times, and as quickly as possible. Second, there is an emergence of applications running on mobile computing devices, such as smart phones or tablets, that offer on-demand delivery services and home services (e.g., Instacart, Amazon Fresh, Google Express, Blue Apron), prepared food delivery (e.g., DoorDash, GrubHub, SpoonRocket, Yelp/Eat24, Seamless, Sprig, Caviar), laundry pick-up and drop-off (e.g., Washio, Rinse), home cleaning (e.g., Handy, Exec), alcohol delivery (e.g., Minibar, Saucey), general services (e.g., Amazon Home Services, Taskrabbit), and many others, all of which require efficient building access to reach their customers. Third, the proliferation of mobile computing devices has enabled individuals to be productive from almost anywhere thanks to constant access to voice and data networks. Individuals now expect to be able to control their lives from their mobile computing devices.

Accordingly, there is a need in the art for improved systems and methods for entering the door to a building on behalf of a tenant of the building.

BRIEF SUMMARY

Various implementations include systems and methods for unlocking a door to a building on behalf of a tenant of the building that addresses the shortcomings of legacy telephone entry systems and allows for more efficient and safer management of building entry requests from third parties. In some implementations, the system taps into the legacy telephone entry systems to communicate with third parties seeking entry into the building. In some implementations, the system communicates with third party computing devices (e.g., stationary or mobile devices) to process entry requests. And, in some implementations, the system communicates entry preferences (or parameters) associated with a tenant with a door lock system to allow for entry during certain time windows or under certain conditions.

In various implementations, a door entry system includes a processor in communication with a memory. The processor executes computer-readable instructions stored on the memory, and the instructions cause the processor to: (1) assign a service telephone number to a first tenant and a second tenant, the first tenant associated with a first building and the second tenant associated with a second building, wherein the first building is associated with a first building identifier and the second building is associated with a second building identifier, the first and second building identifiers being different; (2) receive a telephone call from a first intercom associated with the first building or a second intercom associated with the second building in response to receiving a request to enter the first or second building, the telephone call comprising the service telephone number assigned to the first and second tenants and the building identifier associated with the building intercom placing the telephone call; (3) in response to the received building identifier being the first building identifier, identify the service telephone number as being associated with the first tenant; (4) in response to the received building identifier being the second building identifier, identify the service telephone number as being associated with the second tenant; (5) in response to identifying the service telephone number as being associated with the first tenant, process the request to enter the first building based on one or more criteria associated with the first tenant and cause a lock on the door to the first building to move into an unlocked position in response to the request satisfying the criteria associated with the first tenant; and (6) in response to identifying the service telephone number as being associated with the second tenant, process the request to enter the second building based on one or more criteria associated with the second tenant and cause a lock on the door to the second building to move into an unlocked position in response to the request satisfying the criteria associated with the second tenant.

In other various implementations, a door entry system includes a processor in communication with a memory. The processor executes computer-readable instructions stored on the memory, and the instructions cause the processor to: (1) assign a service telephone number to a tenant, the tenant associated with a building, wherein the building is associated with a building identifier; (2) receive a telephone call from an intercom associated with the building in response to receiving a request to enter the building, the telephone call comprising the service telephone number assigned to the tenant and the building identifier associated with the building intercom placing the telephone call; and (3) process the request to enter the building based on one or more criteria associated with the tenant and cause a lock on the door to the first building to move into an unlocked position in response to the request satisfying the criteria associated with the tenant.

In other various implementations, a door entry system includes a processor in communication with a memory and an intercom. The processor executes computer-readable instructions stored on the memory, and the instructions cause the processor to: (1) receive a request to enter a building from the intercom; (2) receive sound input from the intercom; (3) compare the sound input with a plurality of predetermined access codes; and (4) in response to the sound input matching one of the predetermined access codes, cause a lock on a door to move into an unlocked position, wherein the lock and the door are associated with the intercom.

In other various implementations, a door entry system includes a processor in communication with a memory and an intercom. The processor executes computer-readable instructions stored on the memory, and the instructions cause the processor to: (1) receive sound input from the intercom; (2) compare the sound input with a plurality of stored voice fingerprints, each stored voice fingerprint being associated with a unique tenant; and (3) in response to the sound input matching one of the voice fingerprints, cause a lock on a door to move into an unlocked position, wherein the door is associated with the intercom.

In other various implementations, a door entry system includes a processor in communication with a memory and an intercom. The processor executes computer-readable instructions stored on the memory, and the instructions cause the processor to: (1) receive a first signal and a second signal from a mobile computing device, the first signal identifying a location of the mobile computing device and the second signal identifying a guest associated with the mobile computing device; (2) receive a request to enter a building from the intercom; (3) in response to receiving the request to enter the building, compare the identified guest with a list of approved guests associated with the building based on the identified location of the mobile computing device; and (4) in response to the identified guest matching one of the approved guests, cause a lock on the door of the building to move into an unlocked position, wherein the lock and the door are associated with the intercom.

In other various implementations, a door entry system includes a processor in communication with a memory and an intercom. The processor executes computer-readable instructions stored on the memory, and the instructions cause the processor to: (1) receive a first signal and a second signal from a mobile computing device, the first signal identifying a location of the mobile computing device and the second signal identifying a tenant associated with the mobile computing device; (2) receive a request to enter a building from the intercom; (3) in response to receiving a request to enter the building, compare the identified tenant with a list of approved tenants associated with the building based on the identified location of the mobile computing device; and (4) in response to the identified tenant matching one of the approved tenants for the building, cause a lock on a door of the building to move into an unlocked position, the lock and the door being associated with the intercom.

In other various implementations, a door entry system includes a processor in communication with a memory and an intercom. The processor executes computer-readable instructions stored on the memory, and the instructions cause the processor to: (1) receive a time window during which the door to the building is to be unlocked in response to receiving a request to enter the building, the time window received from a computing device associated with a tenant of the building, and the time window comprising a start time and an end time; and (2) in response to receiving a request to enter the building from the intercom during the time window, cause the lock on the door of the building to move into an unlocked position, wherein the intercom is associated with the lock and the door of the building.

In other various implementations, a door entry system includes a processor in communication with a memory and an intercom. The processor executes computer-readable instructions stored on the memory, and the instructions cause the processor to: (1) receive an identity of a guest from a tenant of the building, the identity of the guest being communicated from a first computing device associated with the tenant; (2) generate an invitation to the guest to set up a time window during which a door to the building is to be unlocked, the invitation being communicated to a second computing device associated with the guest via an application programming interface; (3) receive the time window from the second computing device via the application programming interface, the time window comprising a start time and an end time; (4) receive a request to enter the building from the intercom; and (5) cause the lock on the door of the building to move into an unlocked position during the time window in response to receiving the request to enter the building from the intercom, wherein the intercom is associated with the lock and the door of the building.

In other various implementations, a door entry system includes a processor in communication with a memory and an intercom. The processor executes computer-readable instructions stored on the memory, and the instructions cause the processor to: (1) receive an entry request from a remote computing device associated with a guest, the entry request comprising a request to unlock the door of the building during a time window on behalf of a tenant of the building, the time window comprising a start time and an end time; (2) receive a request to enter the building from the intercom, the intercom associated with the building; and (3) cause the lock on the door of the building to move into an unlocked position during the time window in response to receiving the request to enter the building from the intercom.

In other various implementations, a door entry system includes a processor in communication with a memory. The processor executes computer-readable instructions stored on the memory, and the instructions cause the processor to: (1) receive a request to enter the building from a guest on behalf of a second tenant using one or more entry preferences provided by a first tenant of the building; (2) determine if the guest has permission to enter the building on behalf of the second tenant using the entry preferences of the first tenant; and (3) in response to the guest having permission to enter the building on behalf of the second tenant, retrieve the entry preferences provided by the first tenant and communicate one or more of the entry preferences to the guest.

In other various implementations, a door entry system includes a processor in communication with a memory. The processor executes computer-readable instructions stored on the memory, and the instructions cause the processor to: (1) identify that an order for goods or services is being a requested via a computing device, the order being associated with a tenant of a building, the order comprising shipping information identifying the building, and wherein an access code for unlocking a door of the building is associated with the tenant; (2) identify whether the access code is included in the shipping information prior to completing the order for goods or services; and (3) in response to the order for goods or services not including the access code associated with the tenant as part of the shipping information, input the access code into the shipping information.

BRIEF DESCRIPTION OF THE DRAWINGS

The systems and methods may be understood more readily by reference to the following drawings and detailed description that follows, which provide various implementations of the invention.

DETAILED DESCRIPTION

Various implementations include systems and methods for unlocking a lock for a door to a building on behalf of a tenant of the building. These systems and methods address shortcomings of legacy telephone entry systems and allow for more efficient and safer management of building entry requests from third parties. In some implementations, the system taps into the legacy telephone entry system of a building to communicate with third parties seeking entry into the building. In some implementations, the system communicates with third party computing devices (e.g., stationary or mobile devices) to process entry requests. And, in some implementations, the system communicates entry preferences (or parameters) associated with a tenant with a door lock system to allow for entry during certain time windows or under certain conditions.

Figure 1:
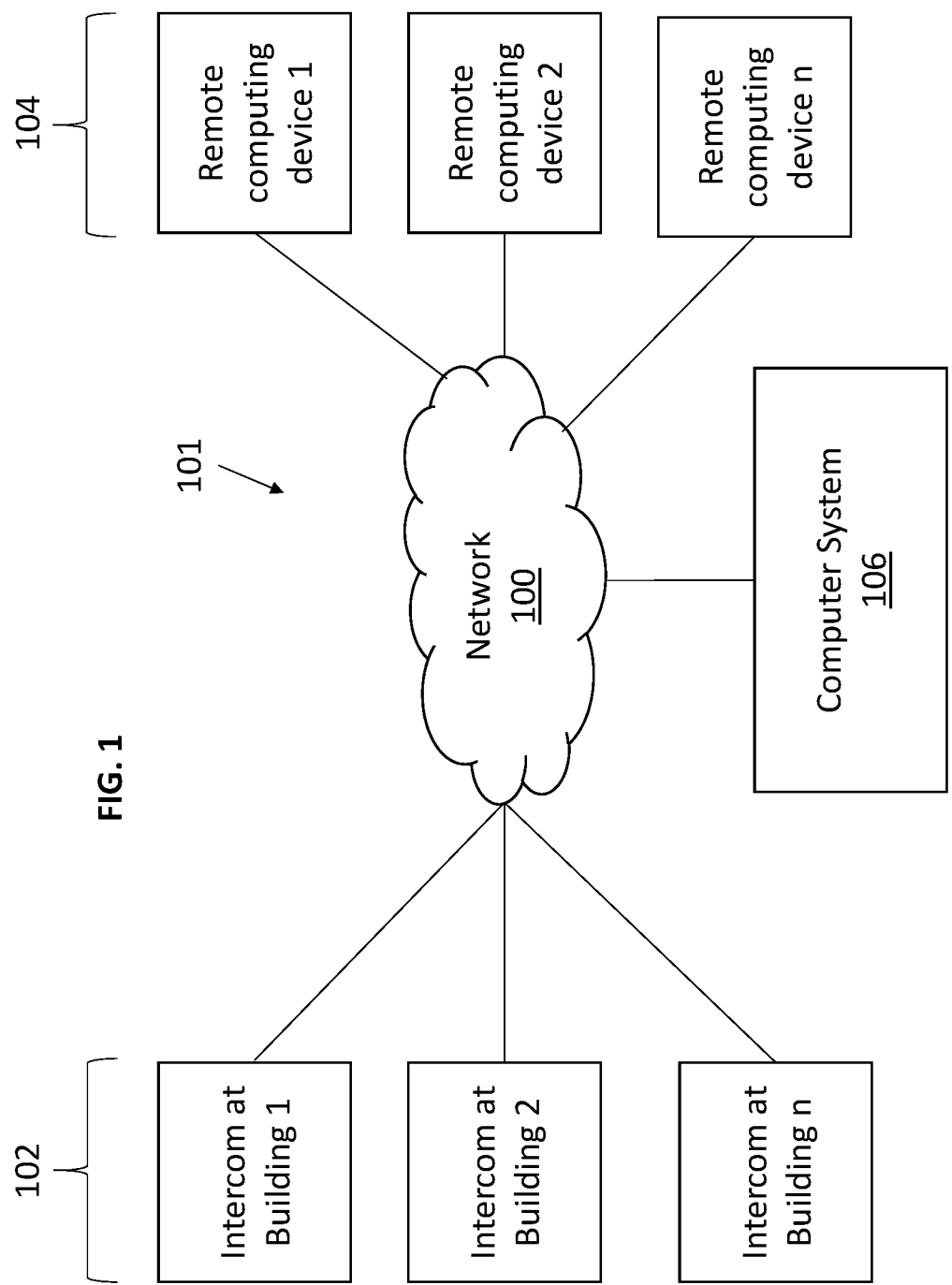
FIG. 1 illustrates a schematic diagram of a door entry for a multi-tenant building according to one implementation.

FIG. 1 illustrates various components and network interactions in a door entry system 101 according to one exemplary embodiment. As shown in FIG. 1, the door entry system 101 includes a computer system 106 that is in communication via one or more networks 100 with one or more building intercom systems 102 and one or more remote computing devices 104 associated with tenants or guests.

In FIG. 1, computer system 106 includes web based graphical interfaces, application program interface (API)-based interfaces, and network access 100 for all forms of communications (e.g., Internet, text, remote API call, video conferencing, plain old telephone service (POTs), etc.), computer processors, and/or persistent, secure databases. In one implementation, the computer system 106 can be hosted within a cloud data center or with a standard PC(s). It is to be appreciated that computer system 106 can be comprised of one or more computers, such as the computer described herein in reference to FIG. 11. Further, if the computer system 106 includes multiple computers, it is to be appreciated that the computers may be located together or remotely. In one aspect, the computer system 106 may be cloud hosted. Though cloud hosting may be a preferred method, how the computer system 106 is hosted is independent of various aspects of the invention and therefore flexible.

Network access 100 is used by tenants and guests to interact with the system 106. For example, tenants and guests can use any type of electronic access device depending on availability, accessibility, or personal preference. Common forms of electronic access devices include, for example, the intercom system 102 associated with a building that communicates via network 100 with the computer system 106 and personal (or shared) communication devices 104, such as telephones, smart phones or tablets using app(s), and computers using web site(s) and/or app(s), and the like, that communicate via network 100 with the computer system 106. Further, aspects of the disclosure are not limited to these forms of communication devices and can accommodate any present and future forms of electronic communications. For example, tenants and guests may interact with a separate computing device associated with the building instead of the intercom system 102.

The components described herein are one embodiment of the invention. While components are high-level constructs of the door entry system 101 and are helpful for visualizing the system 101, it is to be appreciated that the system is not constrained to these components and features/functionality of the system can span several components. The various components of the system are accessible via web sites, smart device apps, command line tools, APIs, and the like.

Figure 2:
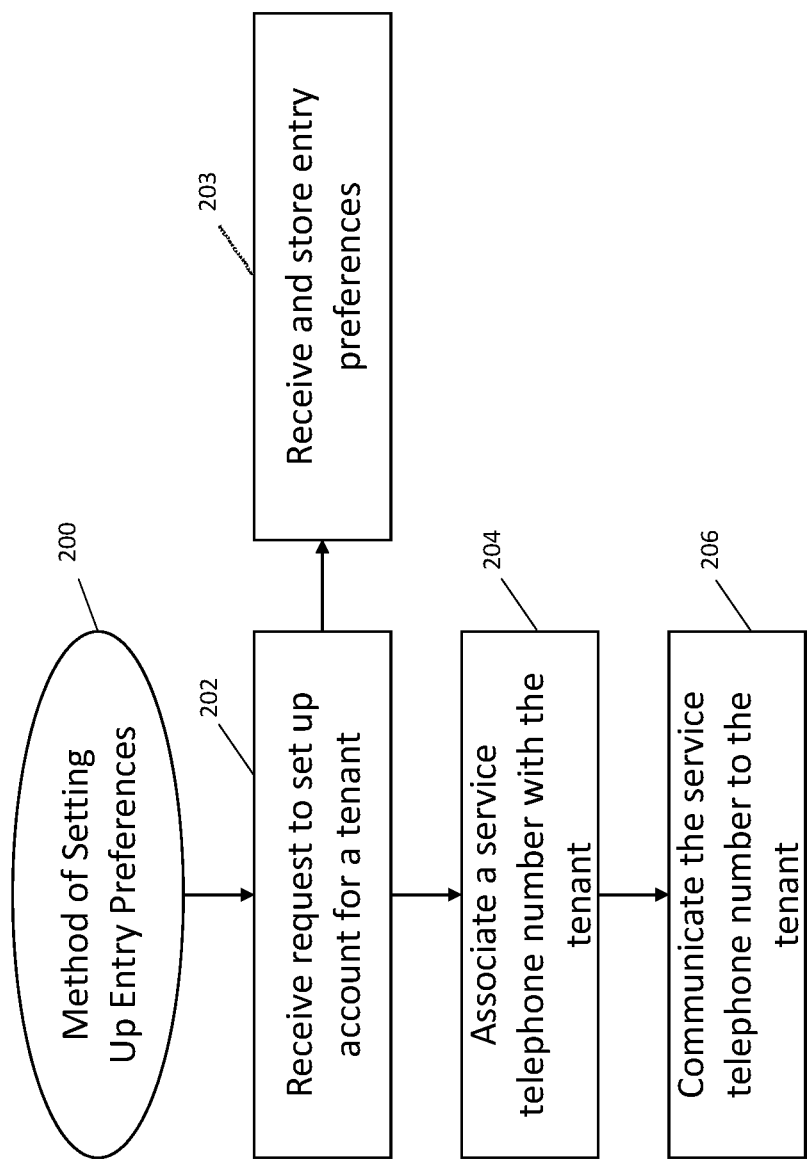
FIG. 2 illustrates a method of setting up entry preferences for a tenant of a building, according to one implementation.

FIG. 2 illustrates a method of setting up entry preferences for a tenant of the building using the door entry system 101. The method 200 begins at step 202 with receiving a request from a tenant to set up an account with the computer system 106. The request may be sent from a remotely located computing device 104 associated with the tenant (e.g., via a dedicated app on the tenant's smart phone and/or tablet and/or via a web-based application accessed via the tenant's computing device). In step 203, the entry preferences provided by the tenant are stored. In step 204, the computer system 106 associates a service telephone number with the tenant's account. In step 206, the computer system 106 sends the service telephone number to the tenant.

The tenant then provides the service telephone number to his/her building manager, and the intercom system 102 for the building calls this service telephone number in response to receiving a request from a guest to enter the building on behalf of the tenant. When the service telephone number is called by the intercom system 102 in response to receiving a request to visit the tenant, the computer system 106 receives the call and processes the entry request on behalf of the tenant based on the tenant's entry preferences. For example, the computer system 106 may contact the tenant in response to receiving an entry request on behalf of the tenant to obtain permission to allow for entry. For example, the computer system 106 may call the tenant (e.g., by initiating a call or by forwarding the telephone call received by the intercom system 102) or the system 106 may contact the tenant via an application programming interface executed by the tenant's computing device 104 (e.g., via a visible and/or audible message delivered by the tenant's computing device 104). In some implementations, the computer system 106 may forward the entry request (e.g., forward the call or provide a visible and/or audible message) to a building manager for the tenant's building or to one or more roommates of the tenant (in addition to or instead of the tenant) to process the request to enter the building. In some implementations, the building manager refers to a person or an entity that manages entry into the building on behalf of tenants of the building. If the building is managed by an entity, the building manager can include an employee or contractor of the management entity.

The computer system 106 may also automatically allow entry on behalf of the tenant depending on the entry preferences set up by the tenant. Various exemplary methods of processing entry requests automatically are described below in relation to FIGS. 3 through 10.

Figure 3:
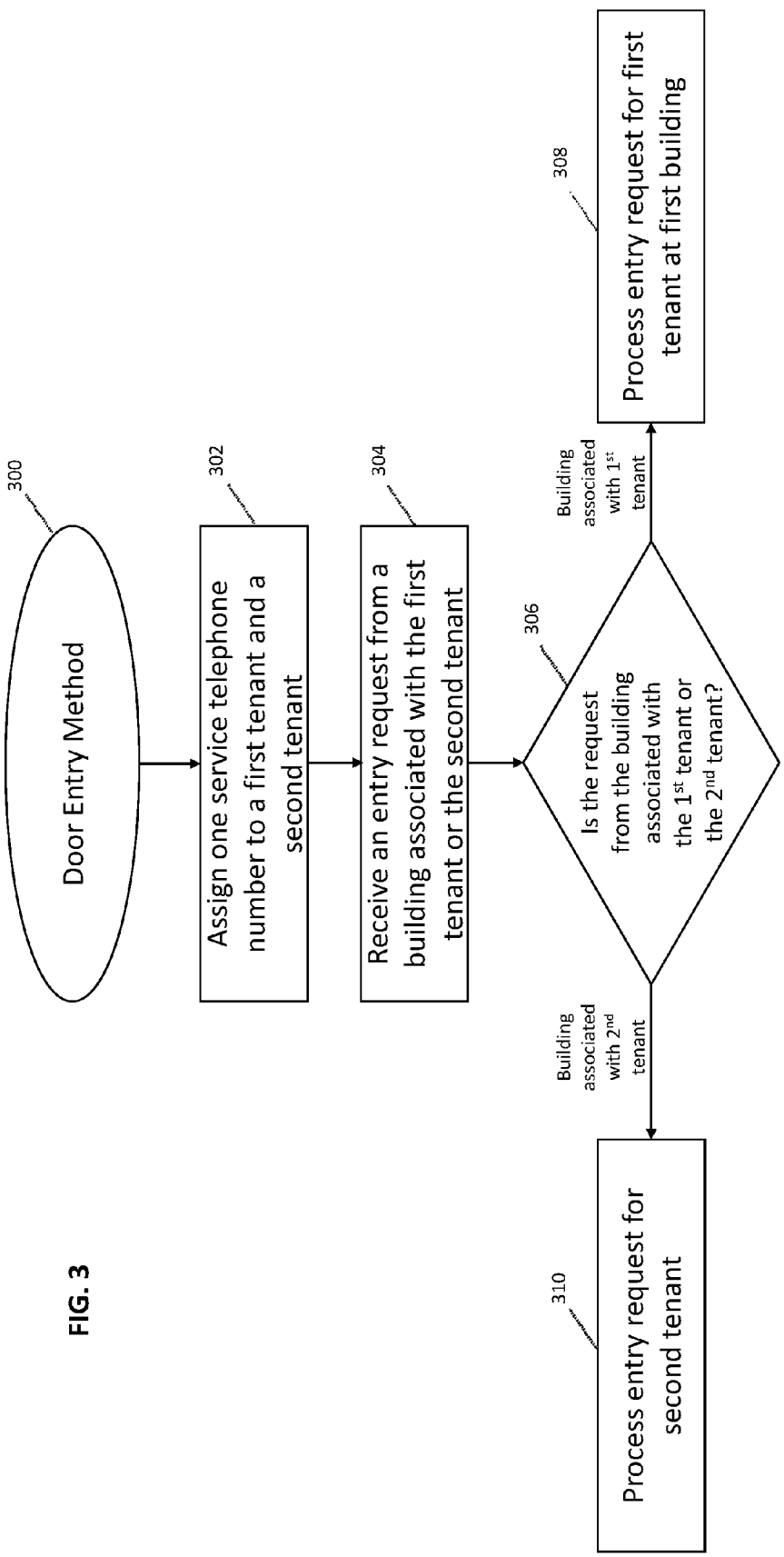
FIG. 3 illustrates a method of processing a door entry request according to one implementation.

According to some implementations, the computer system 106 assigns one unique service telephone number to each tenant in a building, and the service telephone number is associated with the tenant and a building identifier associated with the building. To reduce the number of service telephone numbers that the computer system 106 has to purchase, the computer system 106 may assign one service telephone number to multiple tenants that live in separate buildings. When requests to enter on behalf of one of the tenants is received by the computer system 106, the computer system 106 identifies the tenant associated with the service telephone number called and the building identifier for the building that made the call. FIG. 3 illustrates an exemplary method 300 of assigning service telephone numbers and processing requests to enter the building on behalf of multiple tenants. Beginning at step 302, the computer system 106 assigns one service telephone number to a first tenant and a second tenant. For example, Tenant A in Building A and Tenant B in Building B may be assigned the same service telephone number. In step 304, the computer system 106 receives an entry request from a building associated with the first tenant or the second tenant. For example, the intercom system 102 of Building A may receive a request to enter Building A on behalf of Tenant A, and the intercom system 102 of Building A calls the service telephone number associated with Tenant A. In step 306, the computer system 106 determines whether the request is associated with the first or second tenant. For example, the computer system 106 may use a request telephone number associated with the intercom of the building making the request to identify the building. The request telephone number is the telephone number assigned to the intercom. Alternatively, the system 106 may use another type of identifier uniquely associated with the building communicating the entry request.

If the computer system 106 determines that the request is associated with the first tenant, the computer system 106 processes the entry request for the first tenant at the first building according to the first tenant's entry preferences, as shown in step 308. If the computer system 106 determines that the request is associated with the second tenant, the computer system 106 processes the entry request for the second tenant at the second building according to the second tenant's entry preferences, as shown in step 310. For example, when the computer system 106 receives the call, the computer system 106 identifies the building that made the call as Building A and the tenant associated with the service telephone number and the identified building as Tenant A and processes the entry request for Building A based on Tenant A's entry preferences.

If the computer system 106 receives multiple requests to set up accounts, and if the requests do not include a building identifier associated with each tenant's building (e.g., a request telephone number associated with the intercom 102), the computer system 106 assigns the new tenants unique service telephone numbers. This may require the computer system 106 to purchase the new service telephone numbers if they are not already available. When the tenants connect to the computer system 106 for the first time using the intercom 102 associated with their respective buildings, the computer system 106 is able to identify the building (e.g., from the request telephone number associated with each respective intercom 102) and associate the request telephone number with the respective tenant. This association frees up the service number dedicated for that tenant for other potential new accounts at other buildings. The service telephone numbers assigned to these tenants may then be assigned to tenants requesting new accounts that are associated with other buildings.

The tenant may enter (or change) his/her entry preferences during the account set up process (e.g., step 202) or at another time. The entry preferences may be input via a remotely located computing device 104 associated with the tenant (e.g., via a dedicated app on the tenant's smart phone and/or tablet and/or via a web-based application accessed via the tenant's computing device). In some implementations, the entry preferences associated with the tenant may be set by the building manager of the tenant's building. The entry preferences may include one or more of an access code(s) to be used by guests, a time window(s) during which guests may enter the building, one or more access codes to be used by one or more guests during a particular time window, delivery and/or home service providers that have permission to set up time windows for entrance on behalf of the tenant in the door entry system 101, a list of one or more guests that may enter the building when the mobile computing device of the guest is at the door to the building, permission to automatically lock or unlock the lock of the door in response to the tenant leaving or approaching the building, respectively, permission for the door entry system to use the tenant's entry preferences to allow home or delivery service providers entrance to the building on behalf of another tenant that does not have an account with the door entry system 101, permission to allow the door entry system 101 to monitor e-commerce transactions made by the tenant and input an access code into an e-commerce order if one is not provided before completing the order, and/or permission to allow the system 101 to interface with email and/or calendar applications on the tenant's computing device 104 to identify time windows during which guests need to access the building on behalf of the tenant and set up those time windows as periods during which the door to the building is unlocked. In addition, entry preferences may also include permission to always cause the door of the building associated with the tenant to unlock in response to receiving the request to enter the tenant's building. In some implementations, this permission may be contingent on the location of the tenant's computing device 104 matching the location of the tenant's building. And, in a further implementation, this permission is also contingent upon receiving a sound input from the first intercom that matches a predetermined code associated with the first tenant and in response to the location of the mobile computing device associated with the first tenant not matching the location of the first building associated with the first tenant As noted above, one of the entry preferences may be an access code that allows one or more guests to enter the building on behalf of the tenant. For example, the tenant may provide a unique access code for each guest expected, or the tenant may provide one access code that may be used by one or more guests. Guests may include anyone that does not live (or work) in the building. For example, guests may include friends or family of the tenant, service providers (e.g., delivery services and home service providers, such as cleaners, cooks, laundry service providers, home repair contractors, etc.), or anyone else wanting to enter the building on behalf of the tenant. The tenant may also change the access code(s) periodically and/or the computer system 106 may be set up to automatically change or to prompt the tenant to change the access code(s) periodically. For example, the tenant may authorize the computer system 106 to update access codes for one or more guests according to a predetermined schedule set by the tenant. For example, the predetermined schedule may be weekly, bi-weekly, monthly, quarterly, bi-yearly, yearly, etc. In some implementations, the computer system 106 may provide one-time codes, or codes that may be used only once. In some implementations, the building manager of the tenant's building may provide the access code(s) and/or change the access code(s) or authorize the computer system 106 to update the access code(s) based on a predetermined schedule set by the tenant or the building manager.

Furthermore, in some implementations, the access code(s) may be assigned by the computer system 106 and may include one or more numbers associated with the computing device 104 of the tenant and/or the guest. For example, if the device 104 is a mobile telephone having a telephone number associated with it, the access code associated with the guest may include all or a portion of the telephone number(s).

Figure 4:
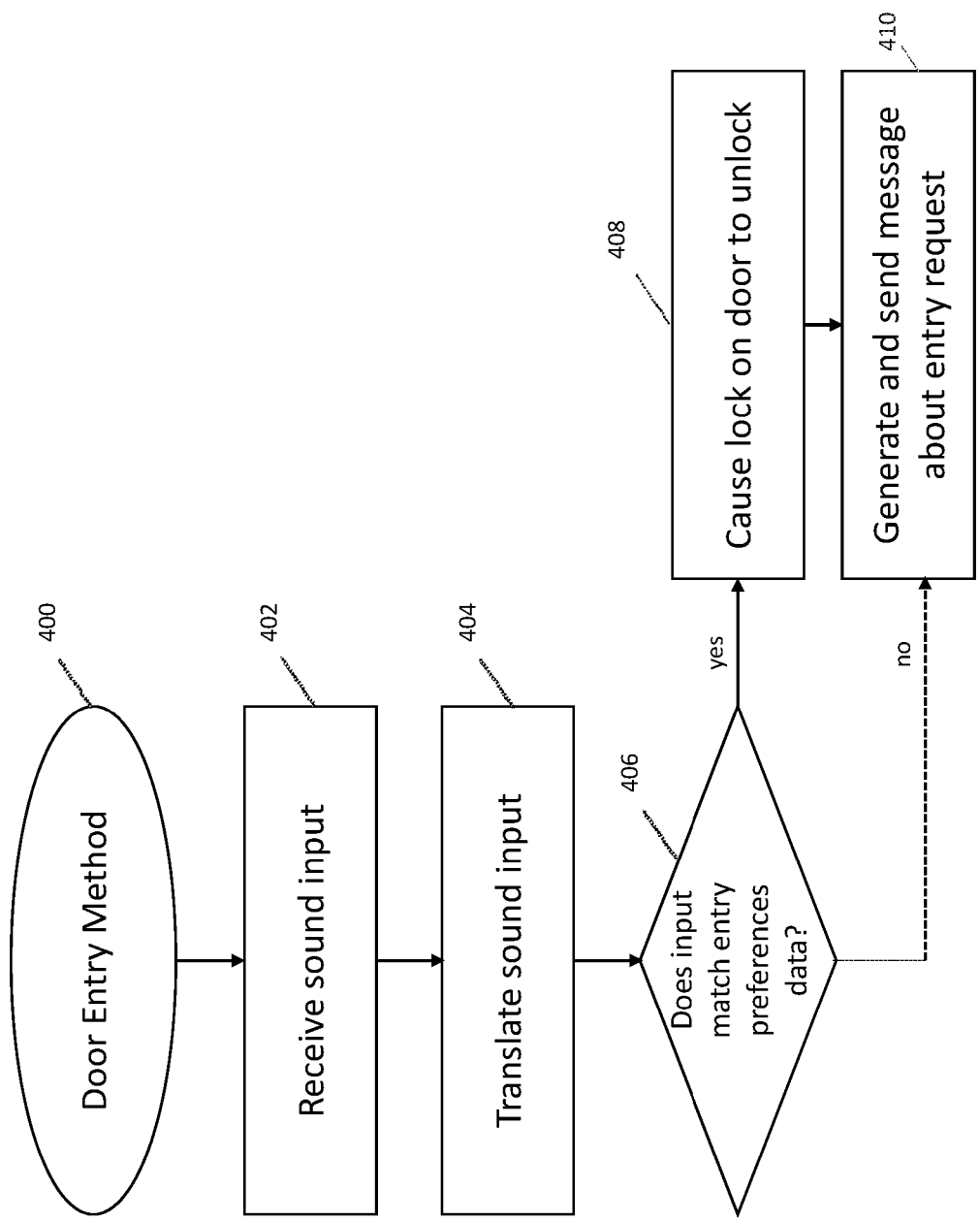
FIG. 4 illustrates a method of processing a door entry request according to another implementation.

FIG. 4 illustrates a method 400 of processing a door entry request according to one implementation. The method 400 begins at step 402 by receiving sound input from an intercom 102 of a building. The sound input received may be the voice of a person speaking near the intercom 102 or it may be a dual-time multi-frequency signal received from keypad of the intercom system 102. At step 404, the sound input is translated into entry data. For example, the sound input may be translated by a sound recognition module. The entry data includes, for example, an access code, which may include a plurality of alpha and/or numeric characters. In another implementation, the sound input may be analyzed by a voice fingerprinting module to determine if the sound input received is associated with a particular tenant or guest.

In step 406, the input access code is compared with the access code(s) stored for the tenant. The input access code may be compared with the access code(s) stored for the tenant using heuristic algorithms, for example a Levenshtein distance between the stored code(s) and the input access code, and/or other suitable mechanisms for recognizing and compensating for inadvertent errors in inputting or translating the code. For example, a heuristic algorithm may consider the input code to be sufficiently close to the stored code if all but one character is correct and the incorrect character is adjacent to (e.g., on a keypad) or sounds similar to (e.g., letters or numbers that sound the similar) the target character. As one example, if the code is 1234, the system recognizes 1235 and 1236 as sufficient to unlock the door, but 1239 is not sufficient.

If the input access code matches the access code(s) stored for the tenant, then the computer system 106 causes the lock on the door to unlock, as shown in step 408. For example, the computer system 106 may generate and send a message to the intercom system 102 of the building to unlock to the door. For example, the message sent to the intercom system 102 may include a dual tone, multi-frequency (DTMF) code. The computer system 106 may also generate and send a message to the tenant's computing device 104 that entry has been granted by the system 106, as shown in step 410. And, the system 106 may store details related to the entry as entry log data. If the input access code does not match the access code(s) stored for the tenant, the computer system 106 does not cause the lock on the door to unlock. In addition, the computer system 106 may generate and send a message to the tenant's computing device 104 that entry was attempted and denied and/or store details related to the attempted entry as entry log data. Details related to entry or attempted entry may include a recording (e.g., data log, video, and/or audio recording (e.g., voice or sound recording)) of the entry attempt, the code entered, the tenant associated with the code, the identification of the person requesting entry, the date/time of entry, and/or whether entry was granted or denied. And, in some implementations, the system 106 communicates at least a portion of this information with the tenant and/or building manager (e.g., automatically or upon request).

In some implementations, when the input access code entered is incorrect, the computer system 106 may request that the guest try again, up to a predetermined number of attempts. Alternatively, the computer system 106 may initiate a telephone call to the tenant following entry of an incorrect code (or after the predetermined number of attempts) to allow the tenant to speak to the guest via the intercom system 102. The tenant may allow the guest to enter by following the steps prescribed by the building owner (e.g., enter an acceptance code into the telephone).

Alternatively, the computer system 106 may generate and send a text message to the tenant upon receiving an entry request or an incorrect access code. The tenant may respond by entering a code or key sequence (e.g., a predetermined phrase, such as "open"). In response to receiving the code or key sequence, the computer system 106 causes the lock to unlock.

The access code assigned for a particular delivery service may be printed on the shipping label or slip associated with an item(s) to be delivered by the delivery service. For example, the tenant may enter the access code into his/her order as "special instructions" related to the delivery, or the system through which the items are ordered may request the access code as part of placing the order.

In addition, in some implementations, the entry preferences may also include sending a signal to a social website (e.g., Facebook, Twitter, Instagram, SnapChat, etc.) that includes a message related to the guest's entry into the building. For example, in response to the guest entering the building, the computer system 106 may generate and communicates a signal to one or more social media websites that includes an identity of the tenant, credentials of the tenant for accessing the social media website, an identity of the guest requesting entry, and a message for posting to the social media website related to the guest's entry into the building. For example, the message may be announcing the arrival of the guest at an event hosted by the tenant or associated with the tenant.

As mentioned above, the tenant may provide an identifier associated with each of one or more guests that are allowed to enter the building on the tenant's behalf as part of the tenant's entry preferences. In response to receiving the one or more identifiers, the computer system 106 generates an invitation to each guest to create an account with the computer system 106 and/or download an application associated with the computer system 106 onto a mobile computing device (e.g., smart phone and/or tablet) of the guest. The computer system 106 receives a response from the invited guest(s) if the invited guest(s) accept the invitation.

Figure 5:
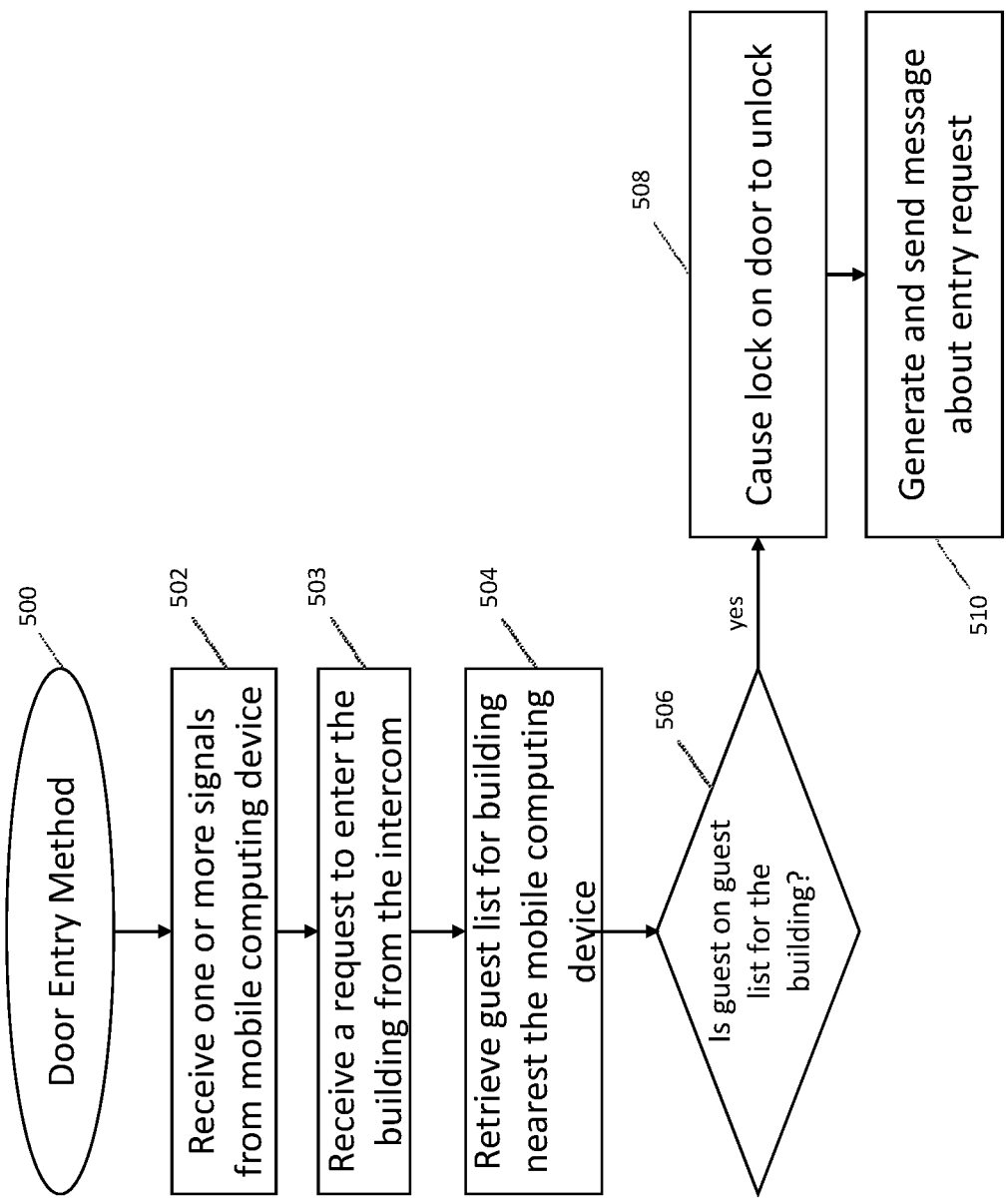
FIG. 5 illustrates a method of processing a door entry request according to another implementation.

FIG. 5 illustrates an exemplary method 500 of processing an entry request from an invited guest using a location of the guest's mobile computing device and the guest's identifier. At step 502, the computer system 106 receives one or more signals from the guest's computing device 104. For example, the signals may include a first signal identifying a location of the mobile computing device 104 and a second signal identifying the guest associated with the mobile computing device. The signals may be communicated to the computer system 106 from the mobile computing device 104 using an application programming interface (API) executed by the mobile computing device 104, for example. If the guest wishes to enter the building, the guest may request entry by pressing a button on the intercom or by using other suitable mechanisms to communicate the entry request to the building's intercom system 102. In step 503, this request to enter the building is received by the computer system 106. In response to receiving the entry request, the computer system 106 retrieves a guest list associated with the building nearest the mobile computing device 104 in step 504 and compares the second signal identifying the guest to the guest list for the building in step 506. If the identified guest is included on the guest list, the computer system 106 generates and sends a message to the building intercom system 102 to cause the lock on the door to unlock, as shown in step 508. This message may include a DTMF code, for example. The computer system 106 may also generate and send a message to the tenant's computing device 104 that entry has been granted by the system 106, as shown in step 510. And, the system 106 may store details related to the entry as entry log data. If the guest is not on the guest list, the computer system 106 does not cause the lock on the door to unlock. In addition, the computer system 106 may generate and send a message to the tenant's computing device 104 that entry was attempted by the guest and denied and/or store details related to the attempted entry as entry log data. Details related to entry or attempted entry may include the code entered, the tenant associated with the code, the date/time of entry, and/or whether entry was granted or denied.

The first signal identifying the location of the mobile computing device 104 may include a global positioning system (GPS) location and/or low-resolution location information based on wireless signal triangulation from the guest's mobile computing device 104. Examples of the second signal identifying the guest may include a username, email, and/or phone number associated with the guest.

In addition, the method may also include receiving a request for entry into the building from the intercom system 102 associated with the door of the building ahead of step 502. The request may include an identifier associated with the tenant.

In another implementation, the tenant may provide a URL (hyper link) to a guest, and the computer system 106 allows entry if the guest has opened the URL on his or her mobile computing device and, optionally, if configured, only when the mobile computing device is near the building. In some implementations, the URL may request to receive the location of the guest. The computer system 106 may provide for one time or multiple entries using this method.

Figure 6:
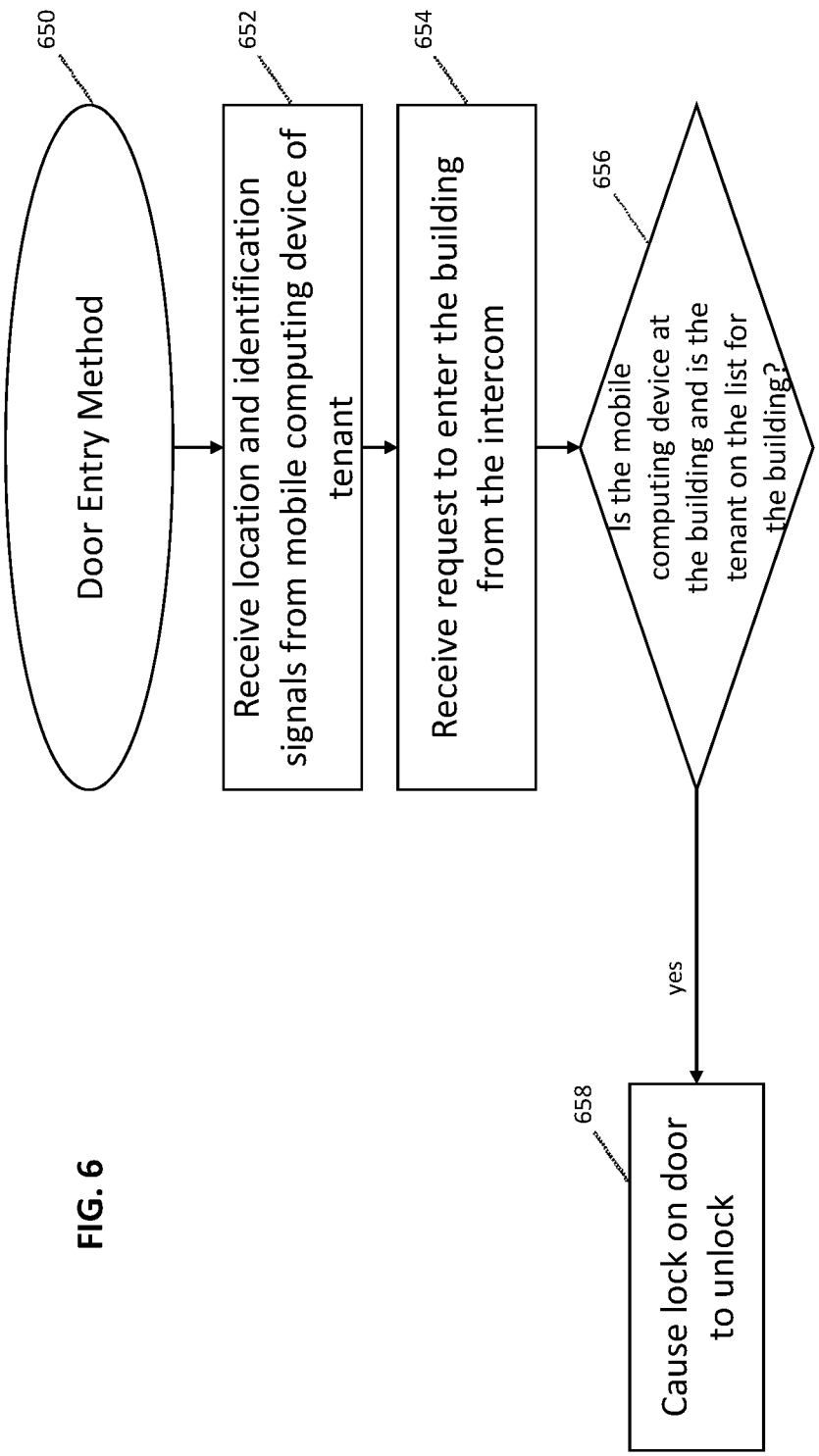
FIG. 6 illustrates a method of processing a door entry request according to another implementation.

The tenant may also set up entry preferences that cause the lock on the door to the building to unlock or lock based on whether the tenant is near the building, respectively. FIG. 6 illustrates an exemplary method 650 of processing an entry request based on the location of the tenant. In step 652, the computer system 106 receives the location of the tenant's mobile computing device and the identification of the tenant from the tenant's mobile computing device (e.g., from an API executed by the tenant's mobile computing device). If the tenant wishes to enter the building, the tenant may request entry by pressing a button on the intercom or by using other suitable mechanisms to communicate the entry request to the building's intercom system 102. In response to receiving the entry request, which is shown as step 654, the computer system 106 compares the location of the building receiving the request to the location of the tenant's mobile computing device 104 and the identification of the tenant with a list of tenants associated with the building for which entry was requested, which is shown as step 656. In response to the identified tenant matching one of the approved tenants associated with the building and the location of the tenant's mobile computing device 104 matching the location of the building, the computer system 106 generates and communicates a message to the intercom system 102 of the building to cause a lock on the door of the building to move into an unlocked position, as shown in step 658.

Figure 7:
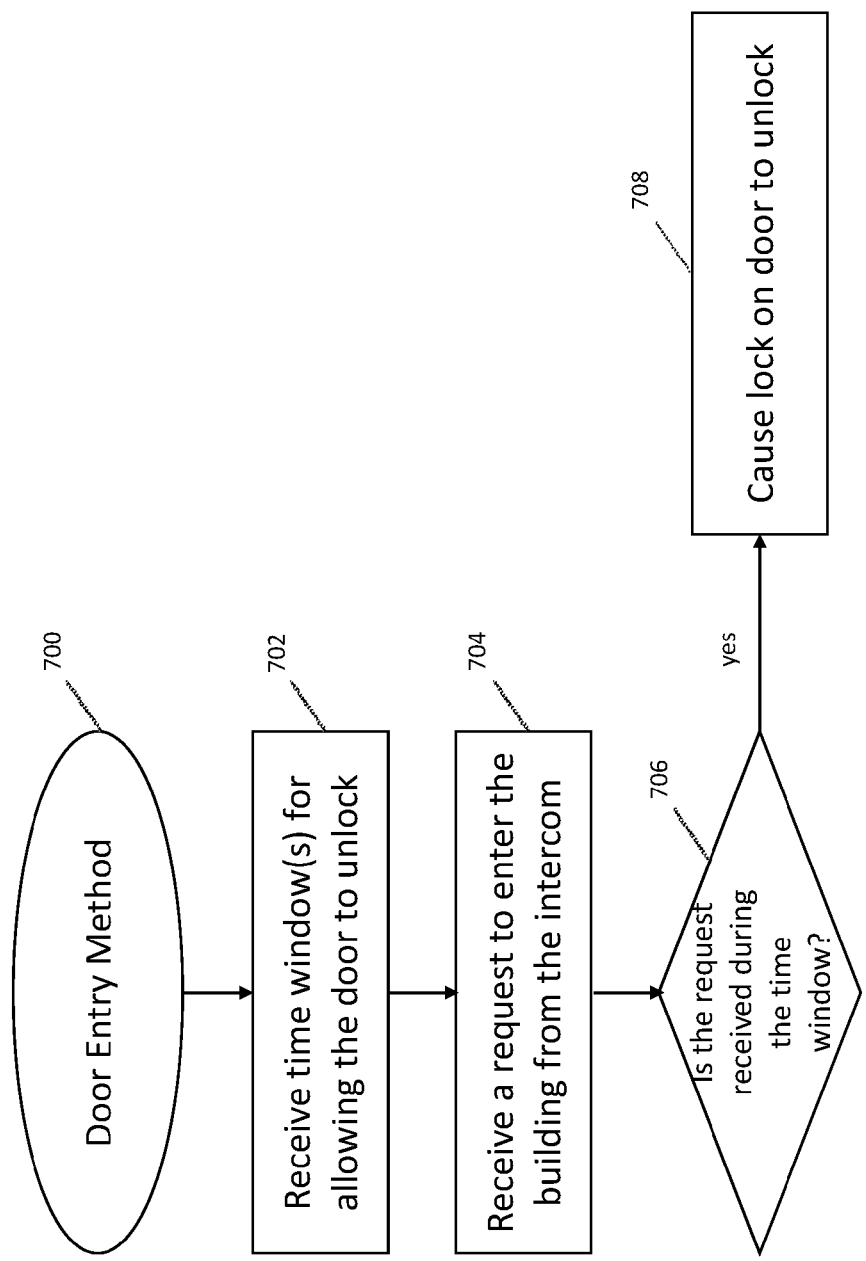
FIG. 7 illustrates a method of processing a door entry request according to another implementation.

The tenant may also set up time windows during which the door to the building is to be unlocked automatically. For example, if the tenant expects a service provider to need access to the building between 8 am and 9 am, the tenant may provide that time window to the computer system 106 for having the door unlocked then. FIG. 7 illustrates an exemplary method 700 of unlocking the lock on the door to the building based on time windows provided by the tenant. In step 702, the computer system 106 receives from the tenant one or more time windows during which the lock on the door to the building is to be unlocked. Each time window includes a start time and end time on a particular date. The time windows may also be set up to recur, for example, daily, weekly, bi-weekly, semi-monthly, monthly, on certain days of the week or month or on certain dates, or a combination thereof. In step 704, the computer system 106 receives a request to enter the building from the intercom. In step 706, the system 106 determines if the request was received during the time window. If so, the system 106 generates and sends a message to the intercom system 102 of the building to unlock the lock of the door, as shown in step 708.

In some implementations, the time window received from the tenant's computing device 104 may be generated by an email interface module that is configured for identifying the time window based on information in an email from a guest to the tenant. For example, the time window generated by the email interface module may be presented to the tenant on the tenant's computing device 104 for approval, and in response to receiving approval, the time window is stored by the computer system 106 as entry preference data for the tenant.

In addition, according to certain implementations, the time window received from the tenant's computing device 104 may be generated by a calendar interface module that is configured for identifying the time window based on a calendar invitation. For example, the calendar invitation may be an appointment created by the tenant or a meeting request shared between the tenant and a guest. In addition, the time window generated by the calendar interface module may be presented to the tenant on the tenant's computing device 104 for approval, and in response to receiving approval, the time window is stored by the computer system 106 as entry preference data for the tenant. And, in some implementations, the computer system 106 may receive an invitation to create a time window from the tenant as a party to a calendar invitation communicated to the guest. The calendar interface module may be configured for generating the time window in vCalendar and/or iCalendar format, and the invitation received by the computer system 106 to create the time window may be provided in vCalendar and/or iCalendar format.

Figure 8:
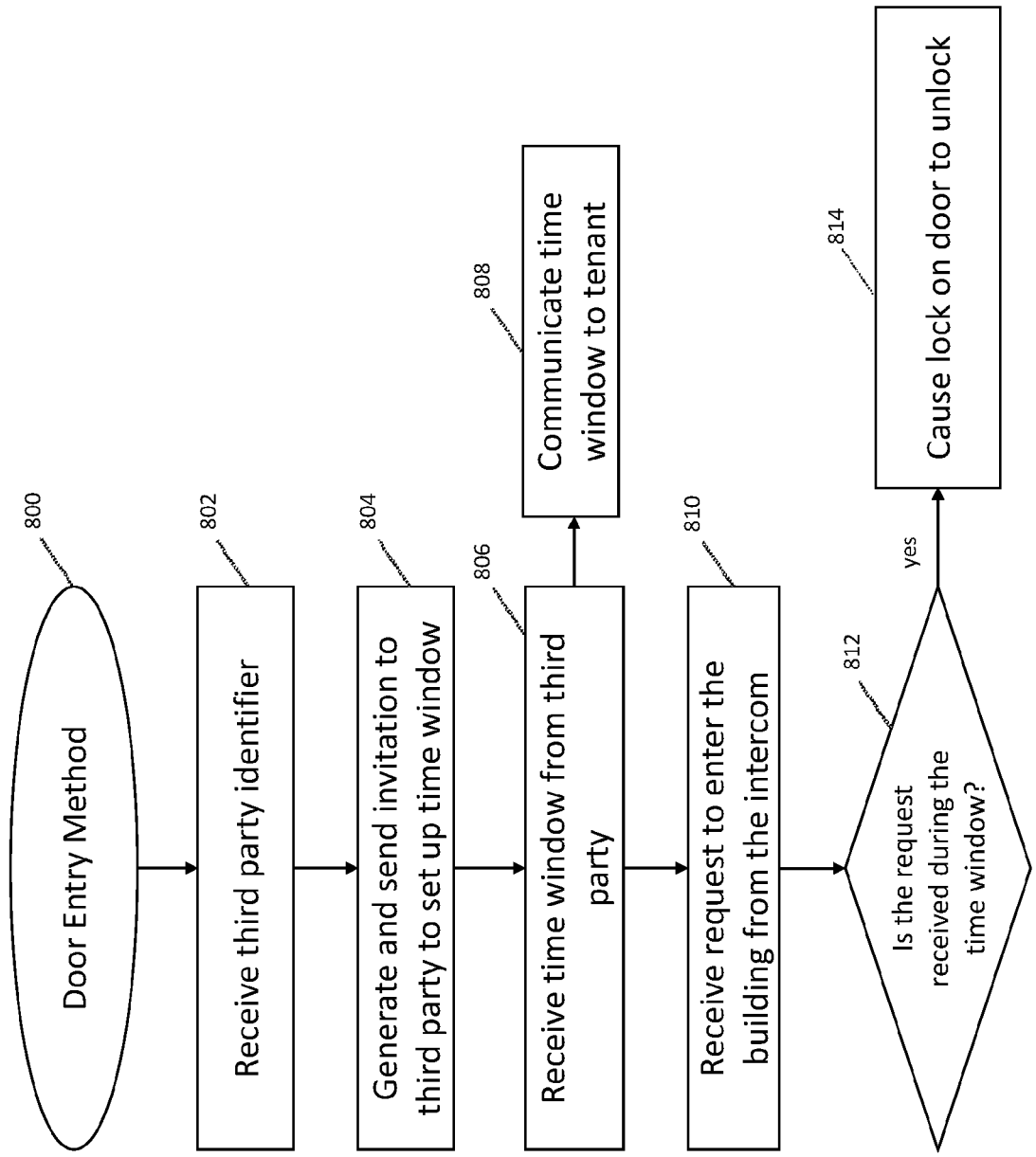
FIG. 8 illustrates a method of processing a door entry request according to another implementation.

Alternatively, the tenant can delegate the ability to set up the time window to a service provider, other guest, or the building manager through the computer system 106. An exemplary method 800 of allowing third party to set up a time window on behalf of the tenant is shown in FIG. 8. In step 802, the computer system 106 receives an identifier associated with the third party from the tenant. The tenant may provide the identifier from the tenant's computing device 104. And, in step 804, the computer system 106 generates and sends the third party an invitation to set up the time window. The time window requested by the third party is received in step 806. The computer system 106 may communicate the time window received from the third party to the tenant in step 808. And, in some implementations, the tenant may input his/her approval for the requested time window (not shown). The information communicated between the computer system 106 and the computing devices 104 of the tenant and third party may be communicated via API or other suitable communication method. In step 810, a request to enter the building is received from the intercom (e.g., a button on the intercom is pushed). The system then compares whether the request was received during the time window in step 812. If the request is received during the time window, the computer system 106 generates and sends a message (e.g., a DTMF code) to the intercom system 102 of the building to unlock the lock of the door, as shown in step 814.

In another implementation, the third party may initiate the process of setting up an entry time window on behalf of the tenant. In such an implementation, the third party may send a request to the computer system 106 to set up the time window on behalf of the tenant via API through the guest's or service provider's remote computing device 104. The remote computing devices 104 may include, for example, a mobile computing device or a relatively stationary computing device, such as a server, associated with the guest or service provider.

Figure 9:
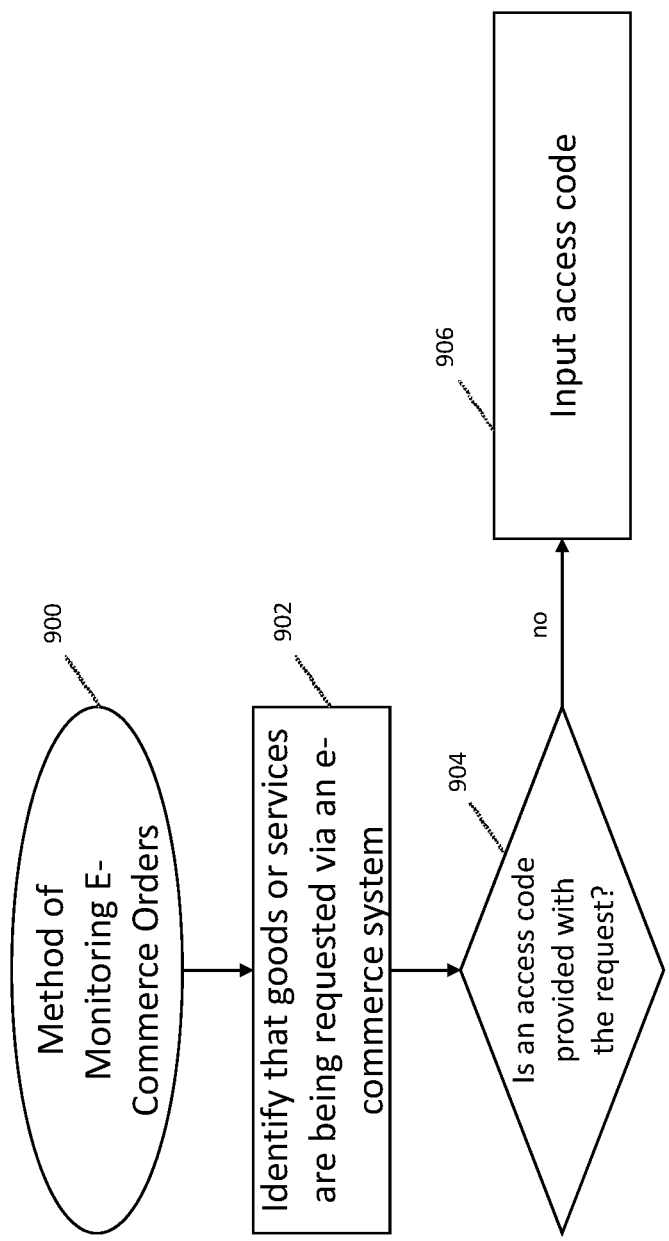
FIG. 9 illustrates a method of processing a door entry request according to another implementation.

The tenant may also use the door entry system 101 to monitor e-commerce orders and input an entry access code into the order before it is completed. FIG. 9 illustrates an exemplary method 900 of monitoring e-commerce orders using an e-commerce interface module. Beginning at step 902, the e-commerce interface module (e.g., a plug in or helper for a browser application that is part of the door entry system 101) identifies that goods or services are being ordered (or requested) using the tenant's computing device 104. The details in the order may include, for example, an identity of the tenant placing the order and shipping information (e.g., address or identity) associated with the tenant's building. Then, in step 904, the e-commerce interface module determines whether an entry (or access) code is provided in the order prior to completing the order. If the access code is not provided, the application inputs the access code before the order is completed or submitted, as shown in step 906.

Figure 10:
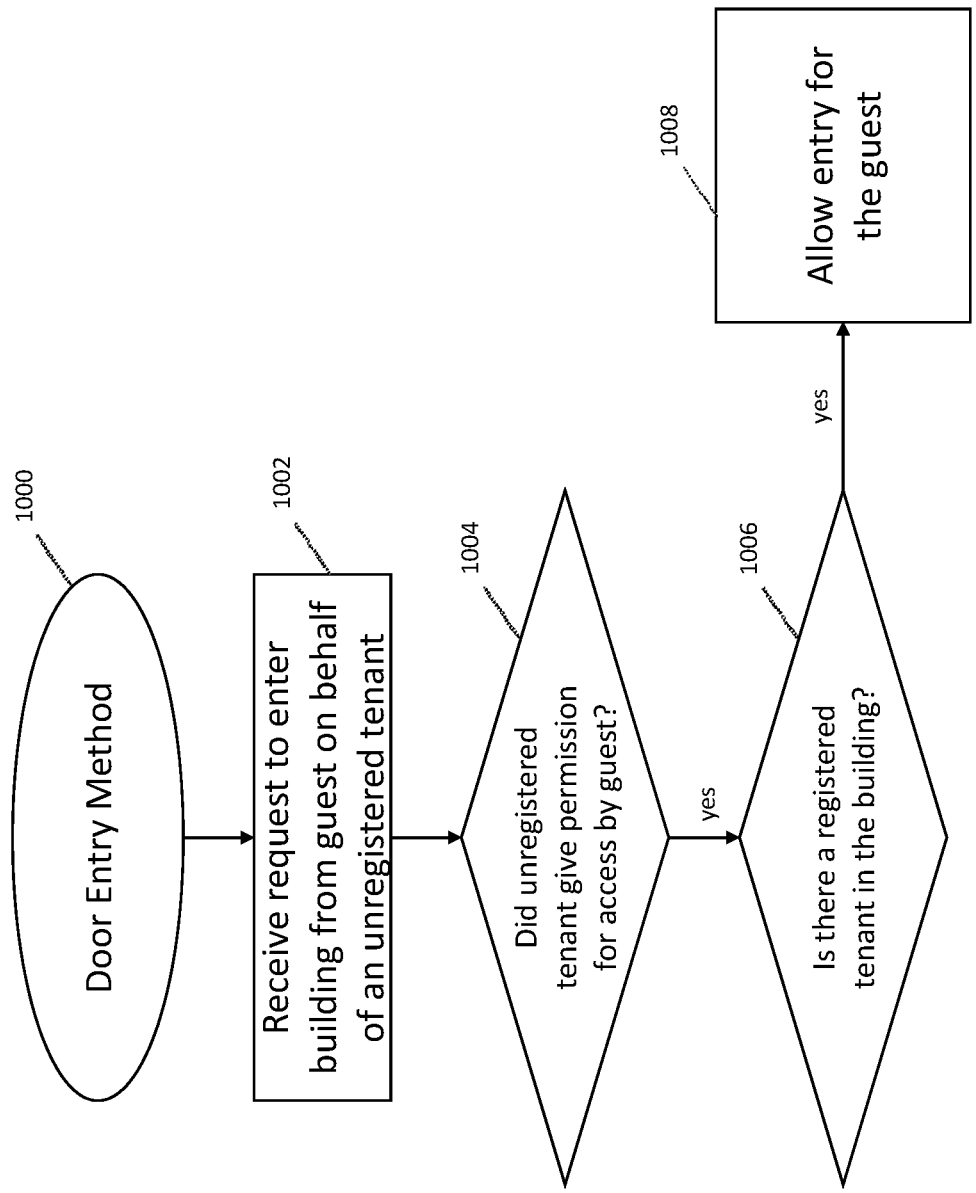
FIG. 10 illustrates a method of processing a door entry request according to another implementation.

The door entry system 101 may also allow guests to enter the building on behalf of a tenant that is not registered with (or have an account with) the door entry system 101 using entry preferences associated with another tenant in the building that is registered with the door entry system 101. FIG. 10 illustrates an exemplary method 1000 of granting access to the building on behalf of an unregistered tenant using the entry preferences provided by a registered tenant in the same building. In step 1002, a request from a guest to enter the building is received by the computer system 106 on behalf of an unregistered tenant. Then, in step 1004, the computer system 106 determines if the unregistered tenant has given permission for the building to be accessible to the guest using another tenant's entry preferences. For example, permission may be provided by the unregistered tenant when checking out for an e-commerce order and stored with the delivery information that is communicated to the delivery service provider (e.g., UPS, FEDEX, USPS, etc.). Alternatively, permission may be provided by the unregistered tenant to the delivery service provider after the e-commerce order is placed in response to a separate confirmation request sent to the unregistered tenant from the delivery service provider. If permission has been granted by the unregistered tenant, the computer system 106 determines if there is a registered tenant in the building, as shown in step 1006. If there is a registered tenant in the building, the computer system 106 allows entry for the guest, as shown in step 1008. For example, the computer system 106 may communicate an access code associated with the registered tenant's entry preferences to the guest or may simply cause the lock on the door to unlock. If, on the other hand, the unregistered tenant did not provide permission for a guest to enter using another tenant's entry preferences or if there is not a registered tenant in the building, no access code may be provided by the computer system 106. Alternatively, in step 1008, the computer system 106 may process the entry request using the location of the guest and API communication with the guest's mobile computing device, depending on the registered tenant's and/or guest's entry preferences.

In some implementations, if the system 106 does not have information about the unregistered tenant, the system 106 may grant access to the guest using the registered tenant's entry preferences with the understanding that the guest is responsible for guaranteeing that the goods or services are being delivered to the correct tenant at the correct address. For example, if a package delivery service provider (e.g., UPS, FEDEX, USPS, etc.) is delivering a package to an unregistered tenant and the system 106 is unable to identify permission preferences from the unregistered tenant, the system 106 grants access to the delivery service provider with the understanding that the delivery service provider is responsible for guaranteeing that the package is being delivered to the correct tenant at the correct address.

In some implementations, the tenant can report a potentially stolen package or unauthorized entry associated with a door to the building to the computer system 106. For example, the tenant communicates the suspected activity, a time during which the activity is suspected to have occurred, and an identification of the suspected door from which the package was stolen or unauthorized entry was made to the computer system 106 with the tenant's computing device 104. The computer system 106 then identifies whether any failed door entries occurred within a time frame that includes the time of the suspected activity (e.g., within a certain number of minutes of the suspected entry or theft). If the number of failed door entries for the time frame exceeds an average number (or a range of acceptable failed door entries) of failed door entries for that time of day and day of the week, the system 106 identifies whether any failed door entries occurred in the time frame at adjacent or proximate buildings (e.g., next door or within a certain radius of the building). The computer system 106 may check records at other buildings after or simultaneously with checking records for the building identified. If the number of failed entry activity detected is higher than expected, the system 106 flags those attempted door entries and the recordings associated with those attempted entries as being potentially fraudulent. The potentially fraudulent entries are then reported to the tenant and possibly other tenants associated with the potentially fraudulent entries (e.g., via their computing devices), which allows the tenant(s) to report the activity to the police, for example. This information may also be communicated directly to building managers and police as well.

Figure 11:
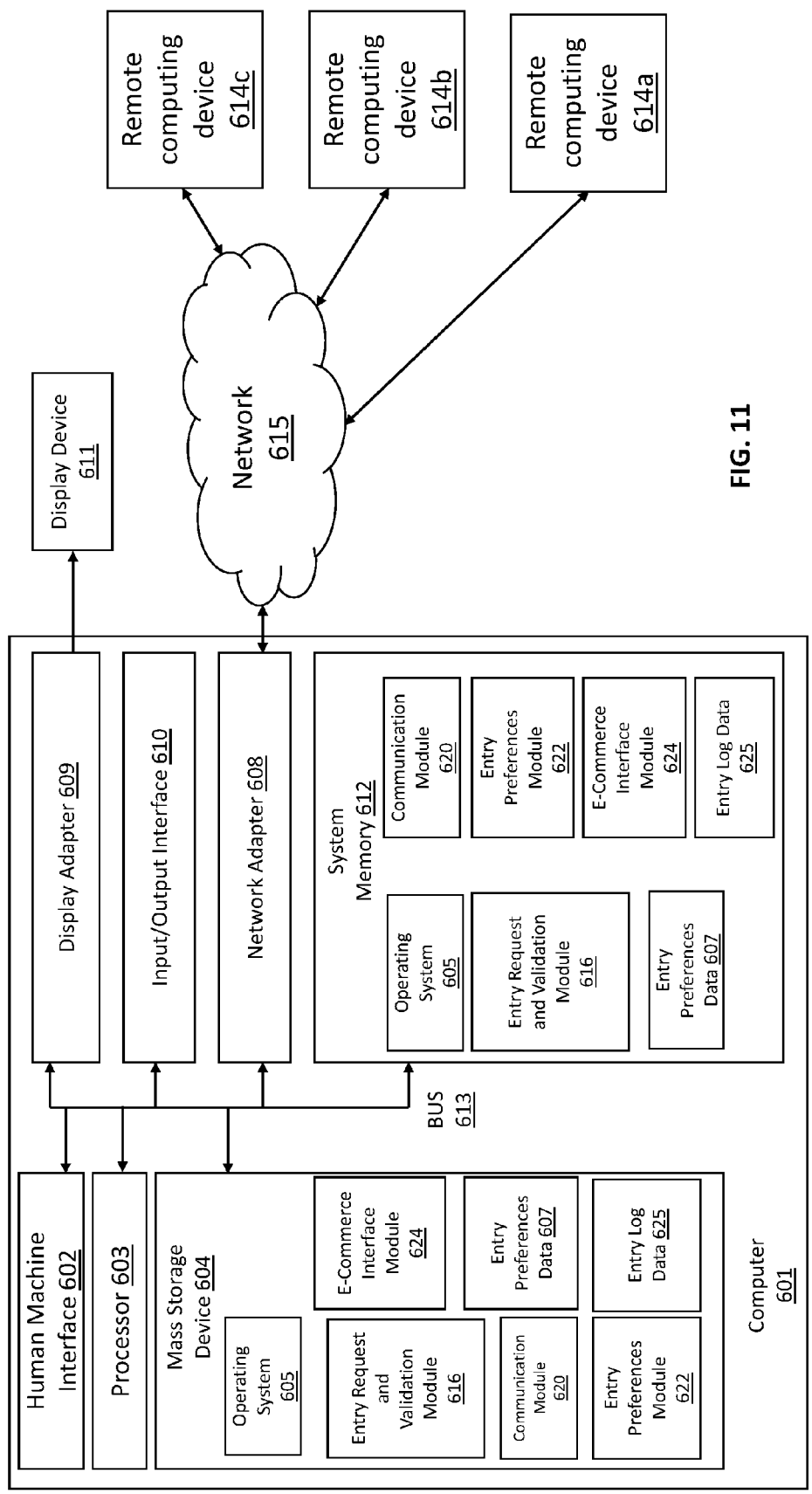
FIG. 11 illustrates a schematic diagram of a door entry server according to one implementation.

FIG. 11 is a block diagram illustrating an exemplary operating environment for performing the above disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 601. The components of the computer 601 can comprise, but are not limited to, one or more processors or processing units 603, a system memory 612, and a system bus 613 that couples various system components including the processor 603 to the system memory 612. In the case of multiple processing units 603, the system can utilize parallel computing. As used herein, "processor" 603 refers to a physical hardware device that is a part of the computer 601, such as the central processing unit, that executes encoded instructions for performing functions or inputs and creating outputs. Generally, the instructions comprise machine-executable code.

The system bus 613 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 613, and all buses specified in this description can also be implemented over a wired or wireless network connection and each of the subsystems, including the processor 603, a mass storage device 604, an operating system 605, a network adapter 608, system memory 612, an Input/Output Interface 610, a display adapter 609, a display device 611, and a human machine interface 602, can be contained within computing device 601 and/or one or more remote computing devices 614a, 614b, 614c at physically separate locations, connected through buses of this form, in effect implementing a fully distributed system. In one aspect, remote computing devices 614a, 614b, 614c can comprise smart devices, such as phones, smart phones, tablets, or portable personal electronic devices (like smart watches) used by tenants and guests to access the computer system 601.

The computer 601 typically comprises a variety of computer readable media. Exemplary readable media can be any available media that is accessible by the computer 601 and comprises, for example and not meant to be limiting, both volatile and non-volatile media, removable and non-removable media. The system memory 612 comprises computer readable media in the form of volatile memory, such as random access memory (RAM), and/or non-volatile memory, such as read only memory (ROM). The system memory 612 typically contains data such as entry preferences data 607 and entry log data 625 and/or program modules, such as operating system 605, entry request and validation module 616, which processes entry requests received by the computer 601, communication module 620, which generates, sends, and receives messages to and from the intercom systems 102 of the buildings and the remote computing devices 104 associated with the guests and tenants, entry preferences module 622, which processes entry preferences provided by tenants, and e-commerce interface module 624, that are immediately accessible to and/or are presently operated on by the processor 603.

In another aspect, the computer 601 can also comprise other removable/non-removable, volatile/non-volatile computer storage media. By way of example, FIG. 6 illustrates a mass storage device 604 which can provide non-volatile storage of computer code, computer readable instructions, data structures, program modules, and other data for the computer 601. For example and not meant to be limiting, a mass storage device 604 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 604, including by way of example, an operating system 605, entry request and validation module 616, communication module 620, entry parameter module 622, and e-commerce interface module 624. Each of the operating system 605 and the various modules 616-624 (or some combination thereof) can comprise elements of the programming and the modules 616-624. Entry preferences data 607 and entry log data 625 can also be stored on the mass storage device 604. Entry preferences data 607 and/or entry log data 625 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 601 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the processor 603 via a human machine interface 602 that is coupled to the system bus 613, but can be connected by other interface and bus structures, such as a parallel port, game port, an IEEE 1394 Port (also known as a Firewire port), a serial port, or a universal serial bus (USB).

In yet another aspect, a display device 611 can also be connected to the system bus 613 via an interface, such as a display adapter 609. It is contemplated that the computer 601 can have more than one display adapter 609 and the computer 601 can have more than one display device 611. For example, a display device can be a monitor, an LCD (Liquid Crystal Display), or a projector. In addition to the display device 611, other output peripheral devices can comprise components such as speakers (not shown) and a printer (not shown) which can be connected to the computer 601 via Input/Output Interface 610. Any step and/or result of the methods can be output in any form to an output device. Such output can be any form of visual representation, including, but not limited to, textual, graphical, animation, audio, tactile, and the like.

The computer 601 can operate in a networked environment using logical connections to one or more remote computing devices 614a, 614b, 614c. By way of example, a remote computing device can be a personal computer, portable computer, a server, a router, a network computer, a peer device or other common network node, and so on. Logical connections between the computer 601 and a remote computing device 614a, 614b, 614c can be made via a local area network (LAN) and a general wide area network (WAN). Such network connections can be through a network adapter 608. A network adapter 608 can be implemented in both wired and wireless environments. Such networking environments are conventional and commonplace in offices, enterprise-wide computer networks, intranets, and the Internet 615.

For purposes of illustration, application programs and other executable program components such as the operating system 605 are illustrated herein as discrete blocks, although it is recognized that such programs and components reside at various times in different storage components of the computing device 601, and are executed by the data processor(s) of the computer. Implementations of one or more of the various modules 616-624 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

Furthermore, it is to be understood that the methods and systems are not limited to specific methods or specific components. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes. Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

The invention claimed is:

1. A door entry system comprising a processor in communication with a memory, wherein the processor executes computer-readable instructions stored on the memory, said instructions cause the processor to:
   assign a service telephone number to a first tenant and a second tenant, the first tenant associated with a first building and the second tenant associated with a second building, wherein the first building is associated with a first building identifier and the second building is associated with a second building identifier, the first and second building identifiers being different;
   receive a telephone call from a first intercom associated with the first building or a second intercom associated with the second building in response to receiving a request to enter the first or second building, the telephone call comprising the service telephone number assigned to the first and second tenants and the building identifier associated with the building intercom placing the telephone call;
   in response to the received building identifier being the first building identifier, identify the service telephone number as being associated with the first tenant;
   in response to the received building identifier being the second building identifier, identify the service telephone number as being associated with the second tenant;
   in response to identifying the service telephone number as being associated with the first tenant, process the request to enter the first building based on one or more criteria associated with the first tenant and cause a lock on the door to the first building to move into an unlocked position in response to the request satisfying the criteria associated with the first tenant; and
   in response to identifying the service telephone number as being associated with the second tenant, process the request to enter the second building based on one or more criteria associated with the second tenant and cause a lock on the door to the second building to move into an unlocked position in response to the request satisfying the criteria associated with the second tenant.

2. The door entry system of claim 1, wherein the first building identifier comprises a first request telephone number associated with the first intercom, and the second building identifier comprises a second request telephone number associated with the second intercom.

3. The door entry system of claim 1, wherein:
   the request to enter the first building comprises a first access code, and the one or more criteria associated with the first tenant comprises the first access code, and
   the request to enter the second building comprises a second access code, and the one or more criteria associated with the second tenant comprises the second access code.

4. The door entry system of claim 1, wherein processing the request to enter the first building comprises generating and communicating a message to the first tenant requesting permission to unlock the door to the first building, and processing the request to enter the second building comprises generating and communicating a message to the second tenant requesting permission to unlock the door to the second building.

5. The door entry system of claim 4, wherein generating and communicating the message comprises forwarding a telephone call to the first tenant requesting permission to unlock the door to the first building, and generating and communicating the message comprises forwarding a telephone call to the second tenant requesting permission to unlock the door to the second building.

6. The door entry system of claim 4, wherein generating and communicating the message comprises sending an audible and/or visible message to the first tenant requesting permission to unlock the door to the first building, and generating and communicating the message comprises forwarding a telephone call to the second tenant requesting permission to unlock the door to the second building.

7. The door entry system of claim 1, wherein:
the request to enter the first building comprises a first guest identifier and a first location identifier communicated from a first mobile computing device associated with the first guest via an application programming interface executed by the first mobile computing device, and the one or more criteria associated with the first tenant comprises the guest identifier being included on a first list of approved guest identifiers and the first location identifier being proximal to the first building, and
the request to enter the second building comprises a second guest identifier and a second location identifier communicated from a second mobile computing device associated the second guest via a second application programming interface executed by the second mobile computing device, and the one or more criteria associated with the second tenant comprises the second guest identifier being included on a second list of approved guest identifiers and the second location identifier being proximal to the second building.

8. The door entry system of claim 1, wherein the request to enter the first or second building comprises a data entry at the first or second intercom, respectively.

9. The door entry system of claim 8, wherein the data entry comprises a dual tone, multi-frequency (DTMF) code.

10. The door entry system of claim 1, wherein causing the lock on the door to the respective first or second building to move into the unlocked position comprises generating and communicating a dual tone, multi-frequency (DTMF) code to the respective first or second intercom.

11. The door entry system of claim 1, wherein the one or more criteria associated with the first tenant is set by the first tenant, and the one or more criteria associated with the second tenant is set by the second tenant.

12. The door entry system of claim 1, wherein the one or more criteria associated with the first tenant is set by a first building manager associated with the first building, and the one or more criteria associated with the second tenant is set by a second building manager associated with the second building.

13. The door entry system of claim 1, wherein processing the request to enter the first building based on one or more criteria associated with the first tenant comprises forwarding the entry request to the first tenant and receiving an approval or denial message from the first tenant, and processing the request to enter the second building based on one or more criteria associated with the second tenant comprises forwarding the entry request to the second tenant and receiving an approval or denial message from the second tenant.

14. The door entry system of claim 13, wherein forwarding the entry request to the first tenant further comprises forwarding the entry request to one or more roommates of the first tenant and receiving the approval or denial message from at least one of the first tenant or the one or more roommates, and forwarding the entry request to the second tenant further comprises forwarding the entry request to one or more roommates of the second tenant and receiving the approval or denial message from at least one of the first tenant or the one or more roommates.

15. The door entry system of claim 1, wherein processing the request to enter the first building based on one or more criteria associated with the first tenant comprises forwarding the entry request to a first building manager associated with the first building and receiving an approval or denial message from the first building manager, and processing the request to enter the second building based on one or more criteria associated with the second tenant comprises forwarding the entry request to a second building manager associated with the second building and receiving an approval or denial message from the second building manager.

16. The door entry system of claim 1, wherein the one or more criteria associated with the first tenant comprises permission to always cause the door of the first building associated with the first tenant to unlock in response to receiving the request to enter the first building, and the one or more criteria associated with the second tenant comprises permission to always cause the door of the second building associated with the second tenant to unlock in response to receiving the request to enter the second building.

17. The door entry system of claim 16, wherein the one or more criteria associated with the first tenant further comprises permission to always cause the door of the first building associated with the first tenant to unlock in response to receiving the request to enter the first building and in response to a location of a mobile computing device associated with the first tenant matching a location of the first building associated with the first tenant, and the one or more criteria associated with the second tenant further comprises permission to always cause the door of the second building associated with the second tenant to unlock in response to receiving the request to enter the second building and in response to a location of a mobile computing device associated with the second tenant matching a location of the second building associated with the second tenant.

18. The door entry system of claim 17, wherein the one or more criteria associated with the first tenant further comprises permission to cause the door of the first building associated with the first tenant to unlock in response to receiving a sound input from the first intercom that matches a predetermined code associated with the first tenant and in response to the location of the mobile computing device associated with the first tenant not matching the location of the first building associated with the first tenant, and the one or more criteria associated with the second tenant further comprises permission to cause the door of the second building associated with the second tenant to unlock in response to receiving a sound input from the second intercom that matches a predetermined code associated with the second tenant and in response to the location of the mobile computing device associated with the second tenant not matching the location of the second building associated with the second tenant.

* * * * *